COLOR IMAGE-REPRODUCING APPARATUS

Filed March 28, 1952 2 Sheets-Sheet 1

INVENTOR.
ARTHUR V. LOUGHREN
BY Laurence B. Dodds
ATTORNEY

Aug. 9, 1955 A. V. LOUGHREN 2,715,154

COLOR IMAGE-REPRODUCING APPARATUS

Filed March 28, 1952 2 Sheets-Sheet 2

INVENTOR.
ARTHUR V. LOUGHREN
BY Laurence B. Dodds
ATTORNEY

United States Patent Office 2,715,154

Patented Aug. 9, 1955

2,715,154

COLOR IMAGE-REPRODUCING APPARATUS

Arthur V. Loughren, Great Neck, N. Y., assignor to Hazeltine Research, Inc., Chicago, Ill., a corporation of Illinois Application March 28, 1952, Serial No. 279,086

8 Claims. (Cl. 178—5.4)

GENERAL

This invention relates to color image-reproducing apparatus and, more particularly, to such apparatus for use in image-projection color-television receivers.

There have been proposed color-television receivers which may be considered as being of a simultaneous type utilizing, for example, three cathode-ray image-reproducing tubes simultaneously to display substantially monochromatic color images individually representative of three primary colors of the color image to be reproduced. In connection with image-projection color-television receivers, the three simultaneously displayed images may be projected on a display screen by an optical system which registers the images on the display screen to reproduce the color image. Such a receiver utilizing a single lens unit for projecting the three substantially monochromatic images may, however, improperly focus the images on the display screen because of a variation with wave length of the focal length of the lens unit. Accordingly, it has heretofore been proposed to employ an achromatic lens unit which provides proper focusing but has the disadvantages of adding to the complexity and, hence, the cost of the receiver.

It is an object of the present invention, therefore, to provide a new and improved color image-reproducing apparatus which avoids one or more of the above-mentioned disadvantages of such apparatus heretofore proposed.

It is another object of the invention to provide a new and improved color image-reproducing apparatus utilizing an optical system including a non-achromatic lens unit for projecting substantially monochromatic color images on a display screen.

In accordance with a particular form of the invention, in a color-television receiver of the image-projection type including an image-display screen, color image-reproducing apparatus comprises circuit means for supplying signals representative of the intensities of predetermined primary colors of a color image to be reproduced. The apparatus also includes a plurality of image-reproducing devices responsive to the aforesaid signals for individually developing substantially monochromatic color images individually representative of the aforesaid primary colors of said image and an optical system including lens means having a focal length varying with wave length for projecting the reproduced images on the screen, the aforesaid devices being spaced from the lens means by different distances effective to compensate for the aforesaid variation in focal length. The color image-reproducing apparatus further includes circuit means for determining the relative dimensions of the reproduced images for compensating for the aforesaid different distances to register the images on the screen.

For a better understanding of the present invention, together with other and further objects thereof, reference is had to the following description taken in connection with the accompanying drawings, and its scope will be pointed out in the appended claims.

Figure 1:
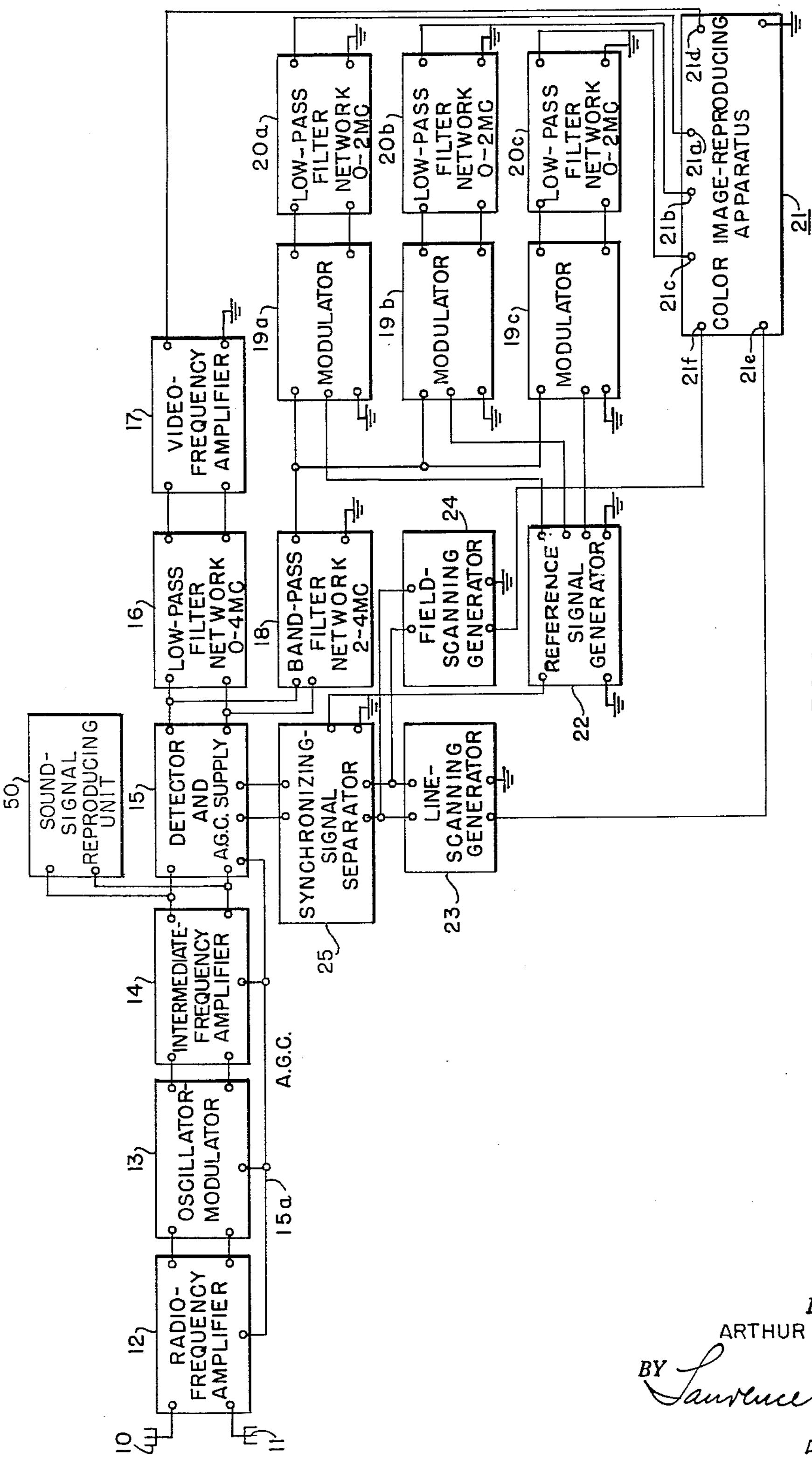
Figure 2:
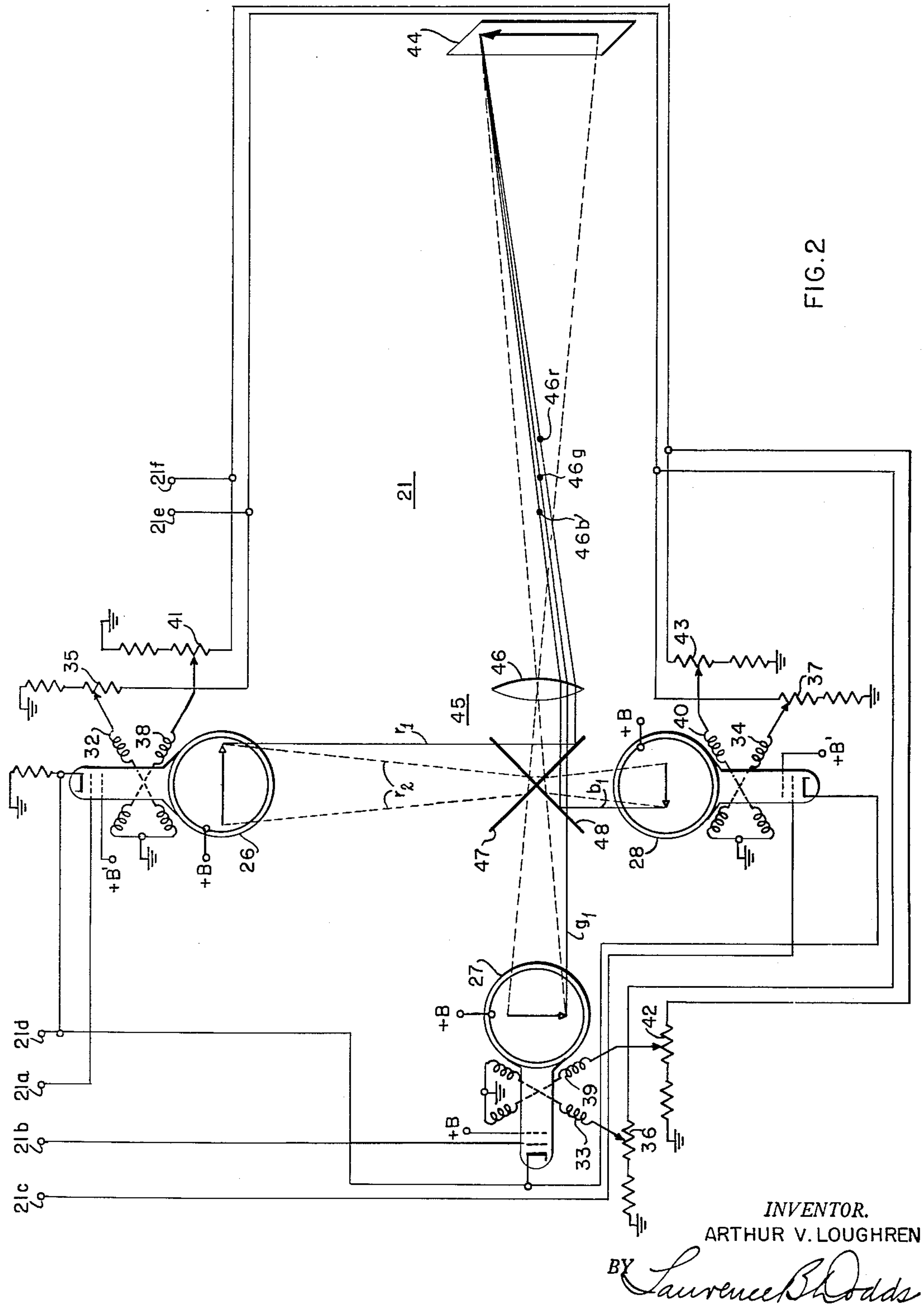

In the accompanying drawings, Fig. 1 is a schematic circuit diagram of a complete color-television receiver of the image-projection type including color image-reproducing apparatus constructed in accordance with a particular form of the invention; and Fig. 2 is a diagram, partly schematic, representing the color image-reproducing apparatus of the Fig. 1 receiver.

The term "color of a color image," as used herein, is that characteristic of the image defined by brightness, hue, and saturation considered from one elemental image area to another.

The term "predetermined primary color," as used herein and in the appended claims with reference to a color image, is defined by predetermined hue and saturation factors and by a variable intensity factor determined by the image. Further, the primary colors individually represent distinct regions of the visible spectrum and together substantially represent the color of the image. No primary color of a selected set of, for example, three primary colors can be matched by a combination of any other primary colors of the set.

The term "substantially monochromatic color image," as used herein and in the appended claims with reference to a color-television receiver operating with a given set of primary colors, refers to a color image having a hue and saturation substantially corresponding to a predetermined primary color. The substantially monochromatic color image ordinarily is represented by dominant light energy in a relatively narrow band of the visible spectrum.

The term "color signal" refers to a signal representative of the intensity of a given primary color of the image to be reproduced considered from one elemental image area to another. For example, three color signals may represent the color of the image.

The term "monochrome-signal component" refers to a video-frequency signal which would reproduce an image substantially of the type normally reproduced in a standard monochrome or black-and-white receiver. Thus, the monochrome signal is a signal representative of the brightness and detail of the image.

The term "color difference signal" refers to a signal representative of the difference between the instantaneous magnitudes of the color signal and the monochrome signal.

The term "modulated subcarrier signal component" represents that signal component comprising a generated reference signal or subcarrier wave signal modulated by at least one color difference signal.

*Description of Fig. 1 color-television receiver*

Referring now more particularly to Fig. 1 of the drawings, there is represented a color-television receiver for receiving and translating a wave signal modulated by a video-frequency signal having a monochrome-signal component, a modulated subcarrier signal component, and synchronizing-signal components. The Fig. 1 receiver is similar to that described and claimed in the copending application Serial No. 164,114 of Bernard D. Loughlin, filed May 25, 1950, and entitled "Color-Television System." A receiver of this type is further described in the October, 1951 issue of the Proceedings of the I. R. E. in an article entitled "Recent Improvements in Band-Shared Simultaneous Color-Television Systems" by Bernard D. Loughlin.

The Fig. 1 receiver includes an antenna system 10, 11, a radio-frequency amplifier 12 of one or more stages, an oscillator-modulator 13, an intermediate-frequency amplifier 14 of one or more stages, and a detector and AGC supply 15, coupled in cascade and in the order named, for receiving a wave signal modulated by the video-frequency signal and for deriving the latter signal therefrom. The AGC supply of the unit 15 is connected to the input circuits of one or more of the stages of the units 12–14, inclusive, by a control circuit conductor 15*a*.

There is connected to the detector and AGC supply 15 a first signal-translating channel responsive to the video-frequency signal for translating at least the low-frequency portion thereof and, preferably, the frequency band of 0–4 megacycles which comprises the monochrome-signal component. Specifically, this channel comprises a low-pass filter network 16 having a pass band of 0–4 megacycles connected to the input circuit of a video-frequency amplifier 17 for amplifying the monochrome-signal component. The amplifier 17 is connected to an input terminal 21*d* of a color image-reproducing apparatus 21, constructed in accordance with the invention and more particularly described hereinafter.

There is also connected to the output circuit of the detector of the unit 15 a second signal-translating channel responsive to the modulated subcarrier signal component of the video-frequency signal for supplying three color difference signals. This channel includes, in cascade, a band-pass filter network 18 having a pass band of 2–4 megacycles and three modulators 19*a*, 19*b*, 19*c* having input circuits connected in parallel to the network 18 and having output circuits connected to the input circuits of three low-pass filter networks 20*a*, 20*b*, 20*c*, respectively, having individual pass bands of 0–2 megacycles. The output circuits of the filter networks 20*a*, 20*b*, 20*c* are connected to input terminals 21*a*, 21*b*, 21*c*, respectively, of the color image-reproducing apparatus 21.

The receiver also includes a reference-signal generator 22 of conventional phase-controlled oscillator design having three output circuits individually connected to the input circuits of the modulators 19*a*, 19*b*, 19*c* for providing three unmodulated subcarrier signals having, for example, 120° phase relations to each other for individually beating with the modulated subcarrier signal component applied to the modulators by the filter network 18 to derive in the modulators color difference signals which, when combined with the monochrome-signal component in a manner to be explained, provide color signals individually representative of the intensities of predetermined primary colors of the image to be reproduced.

An output circuit of the detector and AGC supply 15 is coupled to the input circuits of a line-scanning generator 23 and a field-scanning generator 24 through a synchronizing-signal separator 25 for deriving the line-synchronizing and field-synchronizing signals from the video-frequency signal applied thereto by the unit 15. The output circuits of the line-scanning generator 23 and field-scanning generator 24 are connected in a conventional manner through terminals 21*e* and 21*f*, respectively, to the scanning circuits of the image-reproducing apparatus 21. An output circuit of the synchronizing-signal separator 25 is also connected to the reference-signal generator 22 for synchronizing the operation thereof.

The television receiver also includes a sound-signal reproducing unit 50 of conventional construction connected to the output terminals of the intermediate-frequency amplifier 14 and comprising the usual sound intermediate-frequency amplifier, frequency detector, audio-frequency amplifier, and loudspeaker.

The various units of the Fig. 1 receiver thus far described, with the exception of the color image-reproducing apparatus 21, may be of conventional construction and operation so that a detailed description and explanation of the operation thereof are unnecessary herein.

*Operation of Fig. 1 color-television receiver*

Considering briefly, however, the operation of the Fig. 1 receiver as a whole, a modulated television wave signal intercepted by the antenna system 10, 11 is selected and amplified in the radio-frequency amplifier 12 and then is applied to the oscillator-modulator 13 wherein it is converted to an intermediate-frequency signal. The intermediate-frequency amplifier selectively amplifies the intermediate-frequency signal and supplies that signal to the detector of the unit 15 which derives the modulation components thereof comprising a video-frequency signal. The monochrome-signal component of the video-frequency signal, including frequency components in the band of 0–4 megacycles, is translated through the low-pass filter network 16 and the amplifier 17 to the color image-reproducing apparatus 21 for utilization in a manner more fully to be explained.

For the purpose of developing color images in the color image-reproducing apparatus 21, a modulated subcarrier signal component within the frequency band of 2–4 megacycles of the video-frequency signal derived by the detector of the unit 15 is translated through the band-pass filter network 18 and is applied to the modulators 19*a*, 19*b*, 19*c*. The subcarrier output signals of the reference-signal generator 22 beat with the modulated subcarrier signal component in the modulators to develop in the individual output circuits thereof separate signals individually including 0–2 megacycle frequency bands comprising, for example, red, green and blue color difference signals representing the modulation components of the modulated subcarrier signal. The color difference signals derived by the modulators 19*a*, 19*b*, 19*c* then are translated through the low-pass filter networks 20*a*, 20*b*, 20*c*, respectively, and effectively are individually combined in the color image-reproducing apparatus with the monochrome-signal component applied thereto to provide color signals individually representative of the intensities of the predetermined primary colors of the image to be reproduced. The latter signals provide in the color image-reproducing apparatus 21 color images having intensities individually representative of the primary color intensities of the image to be reproduced and which are optically combined, in accordance with the invention and in a manner more fully explained hereinafter, to reproduce the televised color image.

The synchronizing-signal components of the video-frequency signal developed in the output circuit of the unit 15 are separated from the monochrome-signal and subcarrier signal components in the separator 25 and are applied to the line-scanning and field-scanning generators 23 and 24 to synchronize the operation thereof. These generators preferably supply signals of saw-tooth wave form for application to the deflection circuits of the color image-reproducing apparatus 21 to control the line-scanning and field-scanning operations thereof.

The automatic-gain-control or AGC signal derived in the unit 15 is effective to control the amplification of one or more of the stages of units 12–14, inclusive, to maintain the signal input to the detector of the unit 15 within a relatively narrow range for a wide range of received signal intensities. The sound intermediate-frequency signal is amplified in the unit 50 and the audio-frequency modulation components thereof are derived and converted into sound in an ordinary manner.

*Description of Fig. 2 color image-reproducing apparatus*

Referring now more particularly to Fig. 2 of the drawings, there is represented the color image-reproducing apparatus 21 constructed in accordance with the invention and having input terminals 21*a*–21*f*, inclusive, which correspond to the similarly numbered terminals of the apparatus as represented in Fig. 1. The color image-reproducing apparatus 21 comprises circuit means for supplying signals representative of the intensities of predetermined primary colors of a color image to be reproduced. More particularly, the supply-circuit means comprises a terminal 21*d* for supplying a monochrome-signal component and terminals 21*a*–21*c*, inclusive, for supplying three color difference signals for combination with the monochrome-signal component to provide three color signals individually representative of the intensities of three predetermined primary colors of the color image to be reproduced, for example, red, green, and blue.

The color image-reproducing apparatus 21 also includes a plurality of image-reproducing devices responsive to the above-mentioned supplied signals for individually developing substantially monochromatic color images individually representative of the primary colors of the image to be reproduced. The image-reproducing devices preferably comprise three generally similar cathode-ray tubes 26, 27, 28 of the image-projection type having the cathodes thereof connected to the terminal 21*d* and the control electrodes thereof connected to the terminals 21*a*, 21*b*, 21*c*, respectively. The tubes 26, 27, 28 may be of conventional construction including the usual electrodes and circuit connections and having the usual individual beam-deflection circuits comprising line-scanning windings 32, 33, 34, respectively, and field-scanning windings 38, 39, 40, respectively. To develop substantially monochromatic color images individually corresponding to predetermined primary colors, for example, red, green, and blue, the tubes 26, 27, 28 may utilize phosphor screens for emitting, for example, red, green, and blue light, respectively. Alternatively, the tubes may utilize phosphor screens which emit wide-band light for use in connection with suitable light filters which individually transmit, for example, only red, green, and blue light effectively to impart desired hue and saturation factors to the individual images developed at the screens of the tubes 26, 27, 28.

The color image-reproducing apparatus may also include an image-display screen 44 and includes an optical system 45 including lens means 46 having a focal length varying with wave length for projecting the reproduced images on the screen 44. The lens means 46 preferably is a nonachromatic converging lens of conventional construction having focal points 46*r*, 46*g*, 46*b* corresponding to the wave lengths of dominant light energy emitted by the tubes 26, 27, 28, respectively. For the purpose of illustration, the variation of focal length with wave length has been greatly exaggerated. The variation ordinarily may be, for example, of the order of 1% of the focal length. The optical system also includes dichroic mirror means of conventional construction intermediate the cathode-ray tubes 26, 27, 28 and the lens means 46 for reflecting the reproduced images to the lens means. The dichroic mirror means may comprise, for example, a red light-reflecting mirror 47 which transmits green and blue light and a blue light-reflecting mirror 48 which transmits red and green light.

The cathode-ray tubes 26, 27, 28 are spaced from the lens means 46 by different distances effective to compensate for the variation of local length. The differences between these distances are greatly exaggerated in the drawing for the purpose of clarity. More particularly, the distances are proportioned in accordance with the equation:

$$d=\frac{(i)(f_\lambda)}{(i-f_\lambda)} \qquad (1)$$

where $d$=distance between a given cathode-ray tube screen and lens means 46

$i$=distance between screen 44 and lens means 46

$f_\lambda$=focal length corresponding to the wave length of dominant light energy emitted by the given cathode-ray tube and transmitted by dichroic mirrors 47, 48.

The color image-reproducing apparatus 21 also includes circuit means for determining the relative dimensions of the images reproduced at the cathode-ray tubes for compensating for the aforesaid different distances to register the images over their entire areas on the screen 44. More particularly, this circuit means preferably comprises adjustable line-scanning and field-scanning signal-supply circuits individually coupled to the beam-deflection circuits 32, 33, 34 and 38, 39, 40 for adjusting the relative dimensions of the reproduced images to values directly proportional to the distances individually corresponding thereto between the cathode-ray tubes 26, 27, 28 and the lens means 46. The adjustable line-scanning signal-supply circuits comprise a terminal 21*e* and adjustable voltage dividers 35, 36, 37 which are connected to windings 32, 33, 34, respectively, of the cathode-ray tubes 26, 27, 28, respectively. The field-scanning signal-supply circuits comprise a terminal 21*f* and adjustable voltage dividers 41, 42, 43 which are connected to windings 38, 39, 40, respectively, of the cathode-ray tubes 26, 27, 28, respectively.

*Operation of Fig. 2 color image-reproducing apparatus*

Consider now the operation of the color image-reproducing apparatus 21 operating with a predetermined set of primary colors, for example, red, green, and blue. Red, green, and blue color difference signals developed at the terminals 21*a*, 21*b*, 21*c*, respectively, are applied to the control electrode-cathode circuits of the cathode-ray tubes 26, 27, 28, respectively, where they are combined with the monochrome-signal component applied to each of the cathode circuits from the terminal 21*d* to provide red, green, and blue color signals, respectively, which are representative of the intensities of the red, green, and blue primary colors, respectively, of the color image to be reproduced. These color signals, in conjunction with the line-scanning and field-scanning signals applied to the beam-deflection circuits of the cathode-ray tubes, cause the development of a red image on the screen of the cathode-ray tube 26, a green image on the screen of the cathode-ray tube 27, and a blue image on the screen of the cathode-ray tube 28. These color images have intensities individually representative of the intensities of red, green, and blue primary colors of the color image to be reproduced.

The red image developed by the tube 26 is reflected by the red light-reflecting dichroic mirror 47 to the lens means 46, as indicated by the solid and broken lines $r_1$ and $r_2$, respectively. When the distance between the screen of tube 26 and the lens means 46 is proportioned in accordance with Equation 1, the lens means 46 focuses the red image on the display screen 44. As indicated in the drawing, red light incident on the lens means and perpendicular to the plane thereof passes through the red focal point 46*r*. However, because the lens means 46 has a focal length varying with wave length, green light, emitted by the cathode-ray tube 27 and indicated by the solid line $g_1$, and blue light, emitted by the cathode-ray tube 28 and indicated by the solid line $b_1$, incident on the lens means 46 and perpendicular to the plane thereof pass through different focal points 46*g* and 46*b*, respectively. Accordingly, if the tubes 27 and 28 were positioned at the same distance from the lens means 46 as the tube 26, the variation in focal length with wave length would cause light aberration which would prevent proper focusing of the green and blue images on the screen 44. By proportioning the distances between the cathode-ray tubes 27, 28 and the lens means 46 in accordance with Equation 1, however, the green and blue images may also be focused on the display screen 44. The different distances between the cathode-ray tubes 26, 27, 28 and the lens means 46 then compensate for the variation of focal length with wave length.

When the red, green, and blue images are focused on the screen 44, the different distances between the cathode-ray tubes 26, 27, 28 and the lens means 46 cause different magnifications of the red, green, and blue images. Accordingly, the voltage dividers 35, 36, 37 and 41, 42, 43 may then be adjusted to cause the tubes 26, 27, 28 to display images of different sizes on the screens thereof. Since magnification varies inversely with the distance between each tube and the lens means, adjustment of the relative dimensions of the images reproduced on the screens of the cathode-ray tubes 26, 27, 28 to values directly proportional to the distances between the cathode-ray tubes 26, 27, 28, respectively, and the lens means 46 will register the red, green, and blue images on the screen 44. Hence, the different distances between the cathode-ray tubes and the lens means compensate for the variation in focal length of the lens means 46 and the proportioning of the relative dimensions of the reproduced images compensates for the differences in magnification caused by the different distances.

From the foregoing description of the invention, it will be seen that a color image-reproducing apparatus constructed in accordance with the invention has the advantage of utilizing a relatively inexpensive nonachromatic lens unit for projecting a plurality of substantially monochromatic color images in register on a display screen.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a color-television receiver of the image-projection type, color image-reproducing apparatus comprising: circuit means for supplying three signals individually representative of the intensities of three predetermined primary colors of a color image to be reproduced; an image-display screen; three image-reproducing cathode-ray devices having individual beam-deflection circuits and individually responsive to said signals for developing substantially monochromatic color images individually representative of said primary colors of said image; an optical system for projecting said reproduced images on said screen, said optical system including lens means having a focal length varying with wave length and dichroic mirror means intermediate said devices and said lens means for reflecting said reproduced images to said lens means; said devices being spaced from said lens means by different distances proportioned in accordance with the equation $$d=\frac{(i)(f_\lambda)}{(i-f_\lambda)}$$

where the parameters are as defined in the specification, to compensate for said variation in focal length; and adjustable line-scanning and field-scanning signal-supply circuits coupled to said beam-deflection circuits for adjusting the relative dimensions of said reproduced images to values directly proportional to said distances individually corresponding thereto for compensating for said different distances to register said images on said screen.

2. In a color-television receiver of the image-projection type including an image-display screen, color image-reproducing apparatus comprising: circuit means for supplying signals representative of the intensities of predetermined primary colors of a color image to be reproduced; a plurality of image-reproducing devices responsive to said signals for individually developing substantially monochromatic color images individually representative of said primary colors of said image; an optical system including lens means having a focal length varying with wave length for projecting said reproduced images on said screen; said devices being spaced from said lens means by different distances effective to compensate for said variation in focal length; and circuit means for determining the relative dimensions of said reproduced images for compensating for said different distances to register said images on said screen.

3. In a color-television receiver of the image-projection type including an image-display screen, color image-reproducing apparatus comprising: circuit means for supplying three signals individually representative of the intensities of three predetermined primary colors of a color image to be reproduced; three image-reproducing devices individually responsive to said signals for developing substantially monochromatic color images individually representative of said primary colors of said image; an optical system including lens means having a focal length varying with wave length for projecting said reproduced images on said screen; said devices being spaced from said lens means by different distances effective to compensate for said variation in focal length; and circuit means for determining the relative dimensions of said reproduced images for compensating for said different distances to register said images on said screen.

4. In a color-television receiver of the image-projection type including an image-display screen, color image-reproducing apparatus comprising: circuit means for supplying signals representative of the intensities of predetermined primary colors of a color image to be reproduced; a plurality of image-reproducing devices responsive to said signals for individually developing substantially monochromatic color images individually representative of said primary colors of said image; an optical system for projecting said reproduced images on said screen, said optical system including lens means having a focal length varying with wave length and dichroic mirror means intermediate said devices and said lens means for reflecting said reproduced images to said lens means; said devices being spaced from said lens means by different distances effective to compensate for said variation in focal length; and circuit means for determining the relative dimensions of said reproduced images for compensating for said different distances to register said images on said screen.

5. In a color-television receiver of the image-projection type, color image-reproducing apparatus comprising: circuit means for supplying signals representative of the intensities of predetermined primary colors of a color image to be reproduced; an image-display screen; a plurality of image-reproducing devices responsive to said signals for individually developing substantially monochromatic color images individually representative of said primary colors of said image; an optical system including lens means having a focal length varying with wave length for projecting said reproduced images on said screen; said devices being spaced from said lens means by different distances so proportioned with respect to said varying focal length and the spacing between said lens means and said screen as to compensate for said variation in focal length; and circuit means for determining the relative dimensions of said reproduced images for compensating for said different distances to register said images on said screen.

6. In a color-television receiver of the image-projection type, color image-reproducing apparatus comprising: circuit means for supplying signals representative of the intensities of predetermined primary colors of a color image to be reproduced; an image-display screen; a plurality of image-reproducing devices individually responsive to said signals for individually developing substantially monochromatic color images individually representative of said primary colors of said image; an optical system including lens means having a focal length varying with wave length for projecting said reproduced images on said screen; said devices being spaced from said lens means by different distances proportioned in accordance with the equation $$d=\frac{(i)(f_\lambda)}{(i-f_\lambda)}$$

where the parameters are as defined in the specification to compensate for said variation in focal length; and circuit means for determining the relative dimensions of said reproduced images for compensating for said different distances to register said images on said screen.

7. In a color-television receiver of the image-projection type including an image-display screen, color image-reproducing apparatus comprising: circuit means for supplying signals representative of the intensities of predetermined primary colors of a color image to be reproduced; a plurality of image-reproducing devices individually responsive to said signals for individually developing substantially monochromatic color images individually representative of said primary colors of said image; an optical system including lens means having a focal length varying with wave length for projecting said reproduced images on said screen; said devices being spaced from said lens means by different distances effective to compensate for said variation in focal length; and circuit means for adjusting the relative dimensions of said reproduced images to values directly proportional to said distances individually corresponding thereto for compensating for said different distances to register said images on said screen.

8. In a color-television receiver of the image-projection type including an image-display screen, color image-reproducing apparatus comprising: circuit means for supplying signals representative of the intensities of predetermined primary colors of a color image to be reproduced; a plurality of image-reproducing cathode-ray devices having individual beam-deflection circuits and responsive to said signals for individually developing substantially monochromatic color images individually representative of said primary colors of said image; an optical system including lens means having a focal length varying with wave length for projecting said reproduced images on said screen; said devices being spaced from said lens means by different distances effective to compensate for said variation in focal length; and adjustable line-scanning and field-scanning signal-supply circuits coupled to said beam-deflection circuits for modifying the relative dimensions of said reproduced images for compensating for said different distances to register said images on said screen.

References Cited in the file of this patent

UNITED STATES PATENTS

| | | |
|---|---|---|
| 2,560,351 | Kell | July 10, 1951 |
| 2,594,382 | Bedford | Apr. 29, 1952 |
| 2,594,383 | Bedford | Apr. 29, 1952 |
| 2,611,816 | Darke | Sept. 23, 1952 |
| 2,621,245 | Kell | Dec. 9, 1952 |